(12) United States Patent
Fretz et al.

(10) Patent No.: US 10,392,235 B2
(45) Date of Patent: Aug. 27, 2019

(54) LIGHTING AND SENSORY SYSTEM FOR A PULLING TOOL

(71) Applicant: Warn Industries, Inc., Clackamas, OR (US)

(72) Inventors: Darren G. Fretz, Oregon City, OR (US); Bryan Averill, Portland, OR (US); Kevin Christensen, Portland, OR (US); Ian Wendler, Portland, OR (US); Oliver Heravi, Temecula, CA (US)

(73) Assignee: WARN INDUSTRIES, INC., Clackamas, OR (US)

( * ) Notice: Subject to any disclaimer, the term of this patent is extended or adjusted under 35 U.S.C. 154(b) by 0 days.

(21) Appl. No.: 15/725,862

(22) Filed: Oct. 5, 2017

(65) Prior Publication Data

US 2018/0127246 A1     May 10, 2018

Related U.S. Application Data

(60) Provisional application No. 62/417,813, filed on Nov. 4, 2016.

(51) Int. Cl.
| | | |
|---|---|---|
| *B66D 1/28* | (2006.01) | |
| *B66D 1/12* | (2006.01) | |
| *B60Q 1/26* | (2006.01) | |
| *B60Q 1/50* | (2006.01) | |
| *B66D 1/54* | (2006.01) | |

(52) U.S. Cl.
CPC ............... *B66D 1/28* (2013.01); *B66D 1/12* (2013.01); *B60Q 1/2661* (2013.01); *B60Q 1/50* (2013.01); *B66D 1/54* (2013.01); *B66D 2700/0183* (2013.01)

(58) Field of Classification Search
CPC .......... B60Q 1/2661; B60Q 1/50; B66D 1/28; B66D 1/54; B66D 2700/0183
See application file for complete search history.

(56) References Cited

U.S. PATENT DOCUMENTS

| 9,682,649 | B2 * | 6/2017 | Salter | F21S 43/13 |
| 2017/0321851 | A1 * | 11/2017 | Fretz | B63B 21/10 |
| 2018/0118528 | A1 * | 5/2018 | August | B66D 1/12 |

OTHER PUBLICATIONS

"ZEON Platinum Winch and Advanced Wireless Remote Control," Warn Industries Installation and Operator's Guide, Warn Website, Available Online at https://www.warn.com/truck/assets/pdf/ZeonPlatinum_WinchOperationsManual.pdf, Available as Early as Jan. 1, 2014, 38 pages.

* cited by examiner

*Primary Examiner* — Seung H Lee
(74) *Attorney, Agent, or Firm* — K&L Gates LLP

(57) ABSTRACT

The present application relates generally to systems and methods for controlling operation of a winch system. As one example, lighting control system of the winch system may include a plurality of lights coupled to the winch, a plurality of sensors coupled to the winch, and a controller including memory with instructions for: adjusting an output of the plurality of lights in response to signals received from the plurality of sensors to indicate an operational status of the winch. In this way, the plurality of lights and plurality of sensors may work together in a synergistic manner to create alerts for an operator of the winch system.

18 Claims, 6 Drawing Sheets

LIGHTING AND SENSORY SYSTEM FOR A PULLING TOOL

CROSS REFERENCE TO RELATED APPLICATIONS

The present application claims priority to U.S. Provisional Patent Application No. 62/417,813, entitled "LIGHTING AND SENSORY SYSTEM FOR A PULLING TOOL," filed on Nov. 4, 2016, the entire contents of which is hereby incorporated by reference in its entirety for all purposes.

FIELD

The present application relates generally to systems and methods for controlling operation of a pulling tool with a lighting and a sensor system.

SUMMARY AND BACKGROUND

Vehicles, such as off-road vehicles, commercial/utility trucks used in construction and by contractors, tow trucks, plow trucks, and other utility vehicles are often equipped with auxiliary systems (e.g., accessories) such as winches, plows, lights, and compressors. For example, to operate a winch, an operator of the winch may need to perform actions such as operate a clutch lever, operate a remote control, manage rigging, and spool rope onto (or off) a drum. All of these actions may require a certain level of visual awareness of the operator and in addition may require a certain level of external lighting. Specifically, in dark conditions, the operator may rely on external lighting such as flashlight, headlamp, vehicle lighting, and the like. Thus, if external lighting is not available, the operator may not be able to effectively operate the winch.

Thus, in one example, the above issues may be at least partially addressed by a lighting control system of a winch, including: a plurality of lights coupled to the winch; a plurality of sensors coupled to the winch; and a controller including memory with instructions for: adjusting an output of the plurality of lights in response to signals received from the plurality of sensors to indicate an operational status of the winch. In another example, a winch system may include a lighting system (including the plurality of lights) integrated with a sensor system (including the plurality of sensors). The lighting system may include a plurality of light sources illuminating one or more of the winch drum, clutch lever, rope, hook, and a remote socket. In this way, by shining light directly onto the winch drum, the operator may be able to visually inspect the rope spooling onto the winch drum, even when there is reduced or no external lighting available, for example. In addition, the sensor system of the winch system may include a plurality of sensors such as proximity sensors, light sensors, magnetic sensors, cameras, and the like. By positioning such sensors at or near the plurality of light sources of the lighting system, a position of the rope and hook, relative to the winch drum and/or fairlead, may be determined. Based on the position of the rope and the hook, the sensor system may be able to send winch status feedback to the operator of the winch.

As an example, if the rope is nearly payed off the winch, fully payed on the winch drum, stacked to one side of the winch drum, or if there is rope degradation, the winch system may issue visual alerts (e.g., changing color of light, flashing lights, and the like) and/or audio alerts (via speakers, for example) to the operator. Based on the alerts received, the operator may adjust winch operation. For example, when light is directed from the plurality of light sources onto the rope, cameras of the sensor system may be able to detect degradation on the rope of the winch system. If rope degradation is detected, the sensor system may issue a sensor signal, causing the lighting system to begin flashing its lights. When the operator sees the visual alert in the form of flashing lights, he/she may further inspect the rope and assess the situation. However, if the rope degradation is more severe, the operator may stop operating the winch system, thus averting further degradation of the rope and the system. In this way, the equipment degradation may be reduced and enhanced longevity of the winch may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-3 and 6 are shown approximately to scale.

DETAILED DESCRIPTION

The following detailed description relates to systems and methods for controlling operation of a winch including lighting system, such as the winch shown in FIGS. 1-3 and 6. The winch may include a winch control module with instructions for adjusting winch operation. The winch may additionally include a lighting system and a sensor system. As such, the lighting system may include a plurality of light sources directed towards different regions of the winch (e.g., the winch drum, clutch lever, rope, hook, and a remote socket), as shown in FIGS. 1-3 and 6. The lighting system may serve to illuminate areas of the winch system to an operator so that the operator may be able to inspect the areas of the winch system, including the winch drum, particularly when ambient light levels are low. The sensor system of the winch may include a plurality of sensors such as proximity sensors, light sensors, cameras, position sensors, and magnetic sensors integrated with the lighting system of the winch (as shown in FIGS. 1-3 and 6). The winch may additionally include a winch controller in communication with a drum light controller, as shown in FIG. 4. The drum light controller may receive inputs from the plurality of sensors of the sensor system and the plurality of light sources of the lighting system and adjust operation of the plurality of light sources to relay alerts to the operator of the winch, as shown in the method presented at FIG. 5. As such, the lighting system and the sensor system may work together and provide alerts and feedback to the operator. In one example, if the rope is nearly payed off the winch (detected by one or more cameras, and positon sensors of the sensor system), a visual alert in the form of flashing lights may be displayed to the operator. In this way, the operator may recognize the visual alert, and accordingly stop the winch operation. Thus, the winch system including the lighting system and the sensor system may synergistically work towards creating alerts for the operator. Further, the operator may take corrective actions based on the alerts received, thereby reducing any potential degradation to the system.

Figure 1:
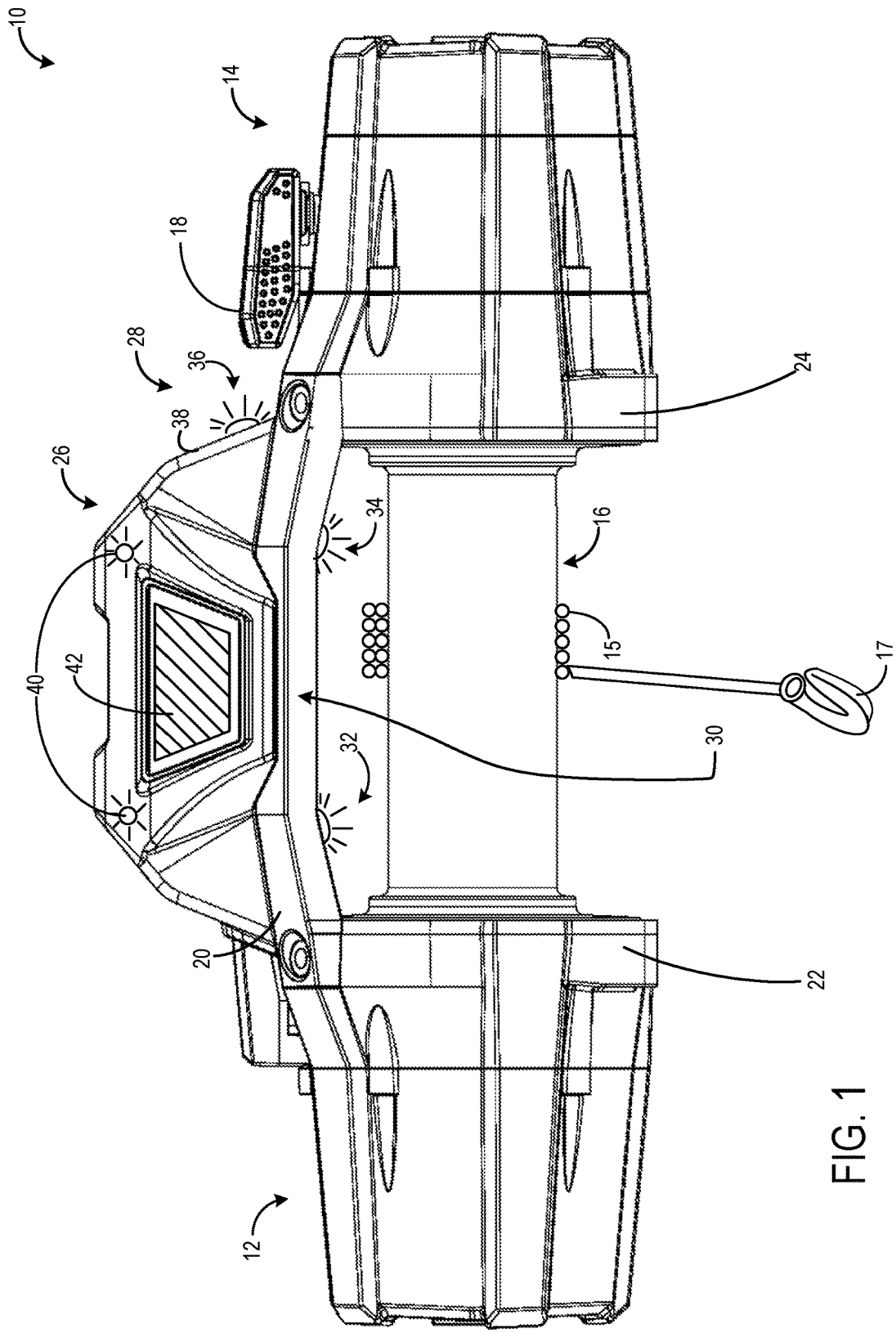
FIG. 1 shows a front view of a winch with a lighting system.
Figure 2:
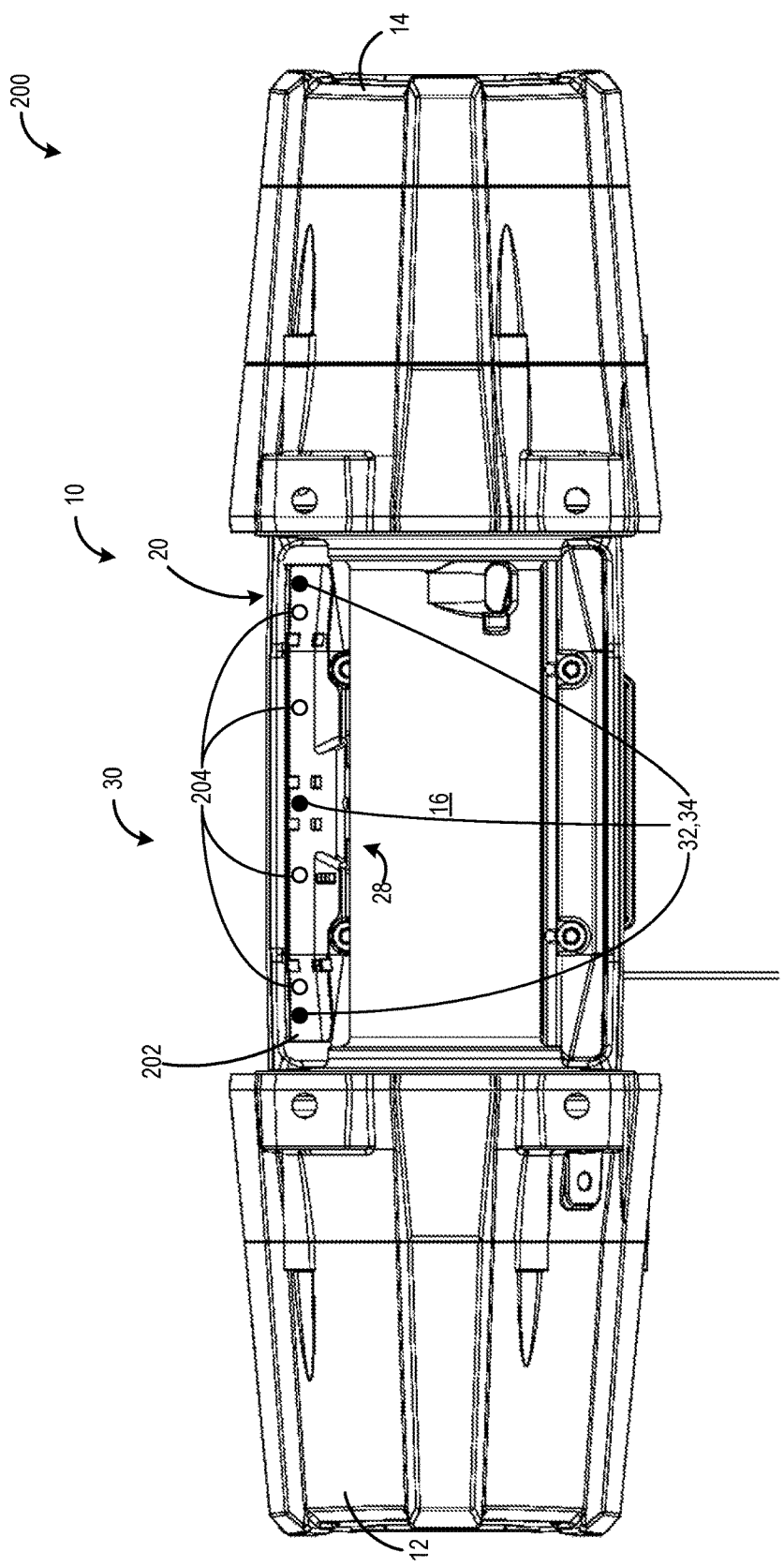
FIG. 2 shows a bottom view of the winch with the lighting system.
Figure 3:
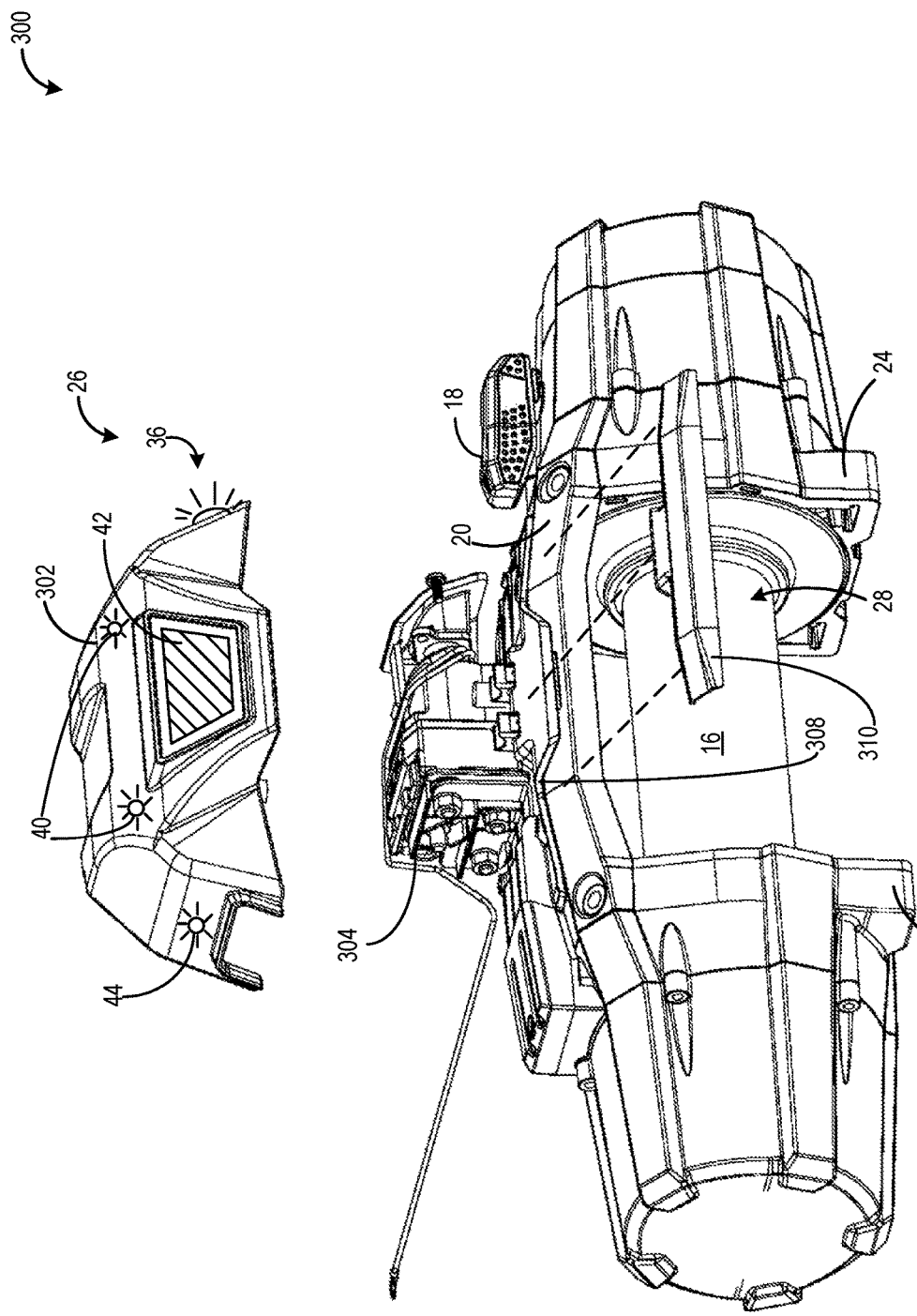
FIG. 3 shows a perspective view of a front side of the winch with the lighting system.
Figure 4:
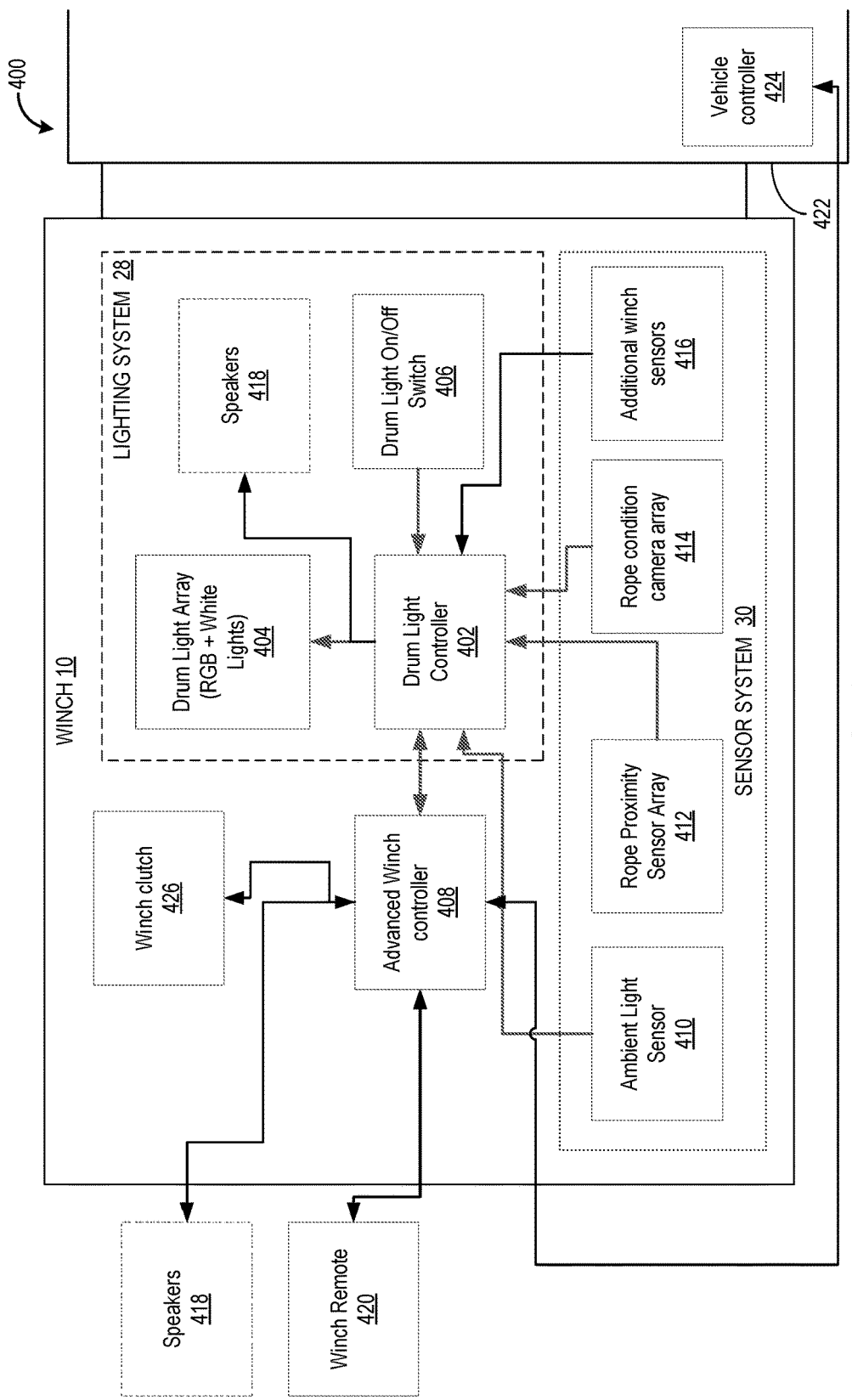
FIG. 4 shows a schematic diagram of the winch comprising a drum lighting system integrated with a sensor system.
Figure 6:
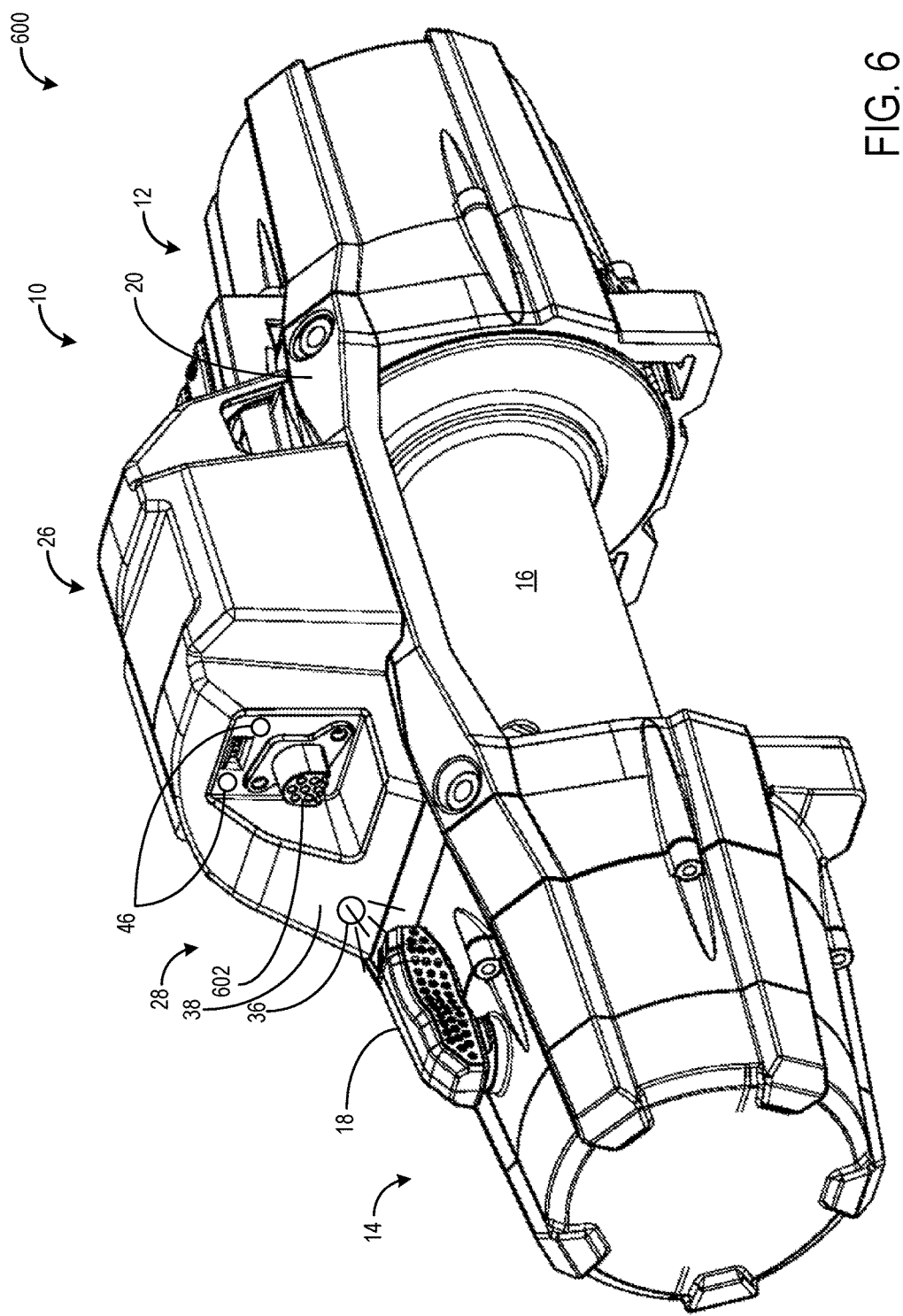
FIG. 6 shows a perspective view of a back side of the winch with the lighting system.

FIGS. 1-3 and 6 show an embodiment of a winch 10 including an integrated lighting system 28 and sensor system 30. Specifically, FIG. 1 shows a front view of the winch 10, FIG. 2 shows a bottom view of the winch 10, FIG. 3 shows a semi-exploded perspective front view of the winch 10, and FIG. 6 shows a perspective back view of the winch 10. Turning first to FIG. 1, a front view of the winch 10 is shown with a control unit or module 26 coupled at a top of the winch 10. The winch 10 includes a motor assembly 12 drivingly connected to a gear reduction unit 14. The motor assembly 12 includes a motor for operating the winch 10. The motor may be powered by a battery of a vehicle to which the winch 10 is installed, as described further below. For example, the winch 10 may be coupled to a front end of the vehicle (such as vehicle 422 shown in FIG. 4). The motor provides power to the gear reduction unit 14 and the gear reduction unit 14 (e.g., transmission of the winch 10) provides driving torque to a rotatable drum 16. The gear reduction unit 14 includes a remote controlled clutch inside the end housing. The winch 10 also include a manual clutch lever 18 that may be actuated by a user to manually engage or disengage the clutch of the gear reduction unit 14. As shown in FIG. 1, the clutch lever 18 is coupled to a top of an outer housing (e.g., casing) of the gear reduction unit 14). The clutch may engage and disengage the gear reduction unit 14 with the drum 16, thereby allowing the drum 16 to be driven by the motor or freespool (e.g., freely rotate without input from the motor and gear reduction unit), respectively.

As shown in FIG. 1, the rotatable drum 16 is a cylinder. A cable, such as a rope 15 (e.g., a cross-section of several rope layers are shown at the top of the drum 16 in FIG. 1) may be wound onto, or off from, the rotatable drum 16 to provide various pulling operations. For example, based on the direction of rotation of the drum, the cable may be wound out from (e.g., off the drum) or into (e.g., into the drum) the winch 10. A tie plate (e.g., tie structure) 20 may be disposed vertically above the drum 16 for connection between a first drum support 22 coupled to the motor assembly 12 and a second drum support 24 coupled to the gear reduction unit 14. The control unit 26 may be removably mounted to a top surface of the tie plate 20. The control unit 26 provides electrical connections and component mounting in a single enclosure. In one example, the control unit 26 is mounted to the tie plate 20. In another example, the control unit 26 is mounted a short distance away from the winch 10 by using a remote mounting kit. The first drum support 22 and the second drum support 24 provide a bearing support structure for rotatably supporting the rotatable drum 16.

The winch 10 may additionally include lighting system 28 integrated with sensor system 30 (shown in FIG. 2). The lighting system 28 may include a plurality of directional, task (which may be the same or similar to directional), and/or accent lighting sources 32, 34, 36, 40, 42, 44 and 46 and/or 310 (as shown in FIG. 3) positioned at different locations on the winch 10. The lighting sources shown in FIGS. 1-3 and 6 are used as non-limiting examples. In alternate embodiments, additional lighting sources (in similar or different locations as those shown in FIGS. 1-3 and 6) may be included in the lighting system 28. Each of the lighting sources 32, 34, 36, 40, 42, 44, and 46 may include one or more lights in various shapes, sizes, and arrangements (or orientations) relative to one another. As one example, lighting sources 32, 34, 36, 44, and 46 may be directional (e.g., task) and/or accent lighting sources, lighting sources 40 may be accent lighting sources, and lighting source 42 may be a backlit lighting source.

The lighting sources 32 and 34 may be coupled to a bottom portion (e.g., surface) of the tie plate 20 such that light from the lighting sources 32 and 34 may be directed at or towards the drum 16. Specifically, lighting sources 32 and 34 may be arranged on a bottom surface of the tie plate 20 which faces a top, outer surface of the drum 16. The lighting source 36 of the lighting system 28 may be coupled to a side 38 of the winch 10 such that the light from the lighting source 36 may be directed towards the clutch lever 18, for example (and thus, lighting source 36 may be referred to as a winch clutch lever light, in one example). As shown in FIG. 1 (and FIG. 3), the side 38 to which the lighting source 36 is coupled to is an outer, side surface of the control unit 26. In this example, the side 38 of the control unit 26 is a side surface that faces the clutch lever 18 and end of the winch 10 including the gear reduction unit 14. However, in alternate embodiments, the lighting source 36 may be additionally positioned on a second outer, side surface of the control unit 26 that is arranged opposite the side 38 (e.g., on the opposite side of control unit 26). In this embodiment, lighting source 36 may illuminate both sides of winch 10 from the sides of the control unit 26. The lighting source 36 may be alternatively referred to as side lighting sources. Herein, the plurality of lighting sources of the lighting system 28 may provide lighting of the winch 10, drum 16, and clutch lever 18.

The sensor system 30 (shown in FIG. 2) of the winch 10 may include a plurality of sensors interspersed between the pluralities of light sources of the lighting system 28. Turning now to FIG. 2, a bottom view 200 of the winch 10 is shown. Herein, the light sources 32 and 34 of the lighting system 28 are coupled to a bottom portion (e.g., bottom facing portion or bottom surface) 202 of the tie plate 20 of the winch 10. As described previously, the winch 10 may additionally include sensor system 30 integrated with the lighting system 28. The sensor system 30 may include a plurality of sensors 204 coupled to the bottom portion 202 of the tie plate 20. As shown in FIG. 2, the sensors 204 are arranged along a length of the bottom portion 202 of the tie plate 20 and interspersed between the lighting sources 32 and 34. While four sensors 204 are shown arranged between and among three lighting sources 32 and 34 in FIG. 2, in alternate embodiments, more or less sensors 204 and lighting sources 32 and 34, in different ratios, may be arranged along the bottom portion 202 of the tie plate 20.

Non-limiting examples of the plurality of sensors 204 include ambient light sensors, proximity sensors, optical sensors, magnetic sensors, temperature sensors, cameras, positon sensors, weight sensors, touch sensors, and the like. In one example, the plurality of sensors 204 of the sensor system 30 may be placed in and around the plurality of light sources (32, 34) to determine the position of the rope 15 and a hook 17 attached to an end of the rope (as seen in FIG. 1), relative to the drum 16. For example, proximity sensors may detect rope position, rope condition, and hook/rigging position. In one example, proximity sensors of the sensor system 30 may detect a distance or proximity of the hook 17 from the winch drum 16. In another example, one or more layer sensors of the sensor system 30 may detect a number of layers of rope wound around an outer surface of the drum 16 (as shown in FIG. 1). The sensor system 30 may then output signals from the plurality of sensors to the winch control module 26 for controlling operation of the winch 10 (as described further below). The sensor system 30, via the control module 26, may send a winch status feedback to the user (e.g., an operator) of the winch 10 as visual and/or audio alerts. As such, the visual and the audio alerts may be directly sent to the user, or sent to a remote location (via a wired connection or a wireless connection).

Turning now to FIG. 3, a perspective view 300 of the winch 10 is shown. In one example, the lighting system 28 may be built into a base 308 of the winch 10. Light sources on the base 308 of the winch may include accent or task (e.g., directional) lighting that illuminates controller unit parts, electrical leads, power ports and/or remote socket areas (e.g., for plugging in the winch remote) of the winch. Alternatively, as shown in FIG. 3, lighting sources 32 and 34 of the lighting system 28 may be an accessory lighting system 310 that is added to the winch 10. As shown in FIG. 3, the accessory lighting system 310 may be mounted to a top or bottom of the tie plate 20 and include a plurality of directional lights that illuminate the winch drum 16. In some embodiments, the accessory lighting system 310 may additionally include one or more sensors, such as the sensors of sensor system 30 described above. In an alternative embodiment, the accessory lighting system 310 may be mounted to tie rods of the winch if the winch includes tie rods at a top of the winch instead of the tie plate 20. Further still, the accessory lighting system 310 may be integrated into the base 308. In one example, the accessory lighting system 310 may be a light bar. As yet another example, the lighting system 28 may be a separate system that may be integrated to the winch 10 via the winch tie plate 20, base 308, or tie rods of the winch 10. As an example, the plurality of lighting sources 32 and 34 of the lighting system 28 may be snapped on to the tie plate 20 (or a tie rod in an alternate embodiment of winch 10 where the drum supports are connected by a tie rod instead of the tie structure). In another example, the plurality of light sources 32 and 34 may be stuck (e.g., via an adhesive) and/or mechanically attached to the tie plate 20.

In view 300, a top cover 302 of the control unit 26 is shown detached from the winch 10 for illustrative purposes only. Power to the lighting system 28 and the sensor system 30 may be provided by a winch electrical control system 304 of the control unit 26. Further, the control system 304 is in electronic communication with the lighting system 28 and sensor system 30 and electrical signals may be transferred back and forth between the control system 304 and each of the lighting system 28 and sensor system 30. As described previously, the lighting system 28 may include additional side lighting sources 36 coupled to a side of the top cover 302 of the control unit 26. The side lighting sources 36 may direct light towards the clutch lever 18, for example.

FIG. 6 shows a perspective back view 600 of the winch 10. As shown in FIG. 6, the lighting source 36 directs light toward the clutch lever 18. Further, the lighting system 28 includes lighting sources 46 which may be task (e.g., directional) and/or accent lighting sources that direct light and/or illuminate a power port 602 of the winch 10. As shown in FIG. 6, the power port 602 is arranged in a side surface of the control unit 26 and the lighting sources are arranged around/proximate to the power port 602.

Returning to FIG. 1, the plurality of light sources of the light system 28 may be integrated with the plurality of sensors of the sensor system 30 to determine a status of the winch 10. For example, when the rope is nearly payed off the winch, fully payed on the winch drum 16, stacked on one side of the winch drum 16 or if there is any rope degradation, the sensor system 30 may generate a sensor signal. Based on the sensor signal, the lighting system 28 may generate alerts in the form of changing colors of the light sources and/or flashing the lights. In another example, the plurality of sensors 204 (shown in FIG. 2) may include cameras. The cameras may capture images of the rope wound around the drum. Images acquired by the camera may be processed by the control unit 26 to detect degradations of the rope. If rope degradation is detected, the sensor system may generate the sensor signal. Accordingly, the lighting system may provide visual and/or audio alerts to the user. As an example, speakers may be integrated with one or more of the lighting system 28 and the sensor system 30. The speakers may provide an audible feedback to the user. In another example, the lighting sources of the lighting system 28 may be controlled based on inputs from the sensors 204 which may include one or more of a temperature sensor, voltage sensor (which may measure a battery voltage of a battery of vehicle that supplies power to the winch), load sensor, and/or current/amperage sensor. For example, if a motor temperature, motor current, winch load, or the like, exceeds a respective, set threshold value (referred to herein as an operational threshold), or a vehicle battery supply voltage decreases below a set threshold level, the control unit of the winch may send a signal to one or more of the light sources of lighting system 28 to alert a vehicle operator. In this way, operating conditions of the winch may be monitored with the help of the lighting system and the sensor system, and alerts may be sent to the user regarding an operating status of the winch using the lighting system. According to the alerts received, the user may be able to perform corrective actions that may reduce equipment degradation and increase the ease of winch operation.

FIGS. 1-3 and 6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 4, a schematic diagram 400 of the winch 10 is shown. Specifically, the winch 10 may include a winch controller 408 in communication with a drum light controller 402 of the lighting system 28 and a winch remote control (also referred to as a winch remote or remote) 420. The winch remote 420 may be either a wireless remote or a remote which is hard-wired to the winch controller 408. In one example, the winch controller 408 may be an example of (or part of) the control unit 26 shown in FIGS. 1 and 3. The winch controller 408 (also referred to as an advanced winch controller) may control the operation of the winch. As described previously, operating the winch may include performing actions such as operating a winch clutch 426 (e.g., moving the clutch into and out of engagement with the transmission and drum), operating the remote control 420 (e.g., sending feedback/status signals to the remote and/or receiving control signals from the remote), managing rigging, and spooling rope onto (or off) a drum (e.g., in power-in or power-out modes of the winch), for example. The drum light controller 402 of the lighting system 28 may additionally be in electronic communication with a drum light array 404 and a drum light switch 406. The drum light controller 402 may receive an input from the drum light switch 406. As such, the input received from the drum light switch 406 may indicate if the drum light switch 406 is on or off. In one example, the input from the drum light switch 406 may in binary form (e.g., 1 when switch 406 is on and 0 when switch 406 is off). Based on one or more inputs received, the drum light controller 402 may control the drum light array 404, as described below.

As shown in the diagram 400, the drum light controller 402 receives inputs from the sensor system 30. Specifically, the drum light controller 402 may receive inputs from a plurality of sensors of the sensor system. For example, the plurality of sensor of the sensor system may include ambient light sensor 410, rope proximity sensor 412, rope condition camera array 414, and additional winch sensors 416. As an example, the ambient light sensor 410 may detect the level or presence/absence of ambient light surrounding the winch 10. The rope proximity sensor 412 may detect one or more of a rope position of the winch rope, a rope condition of the winch rope, and/or a position of the hook/rigging of the winch rope. In one example, rope proximity sensor 412 of the sensor system 30 may detect a distance or proximity of a hook (such as the hook 17 shown in FIG. 1) from a winch drum (such as the winch drum 16 shown in FIG. 1). The additional winch sensors 416 may include one or more of a temperature sensor (such as a winch motor sensor adapted to sense a temperature of the winch motor), a voltage sensor, a load sensor (adapted to sense a load on the winch, such as a load on the winch rope), and/or a current/amperage sensor (adapted to sense a current output of the winch motor). Outputs from these additional winch sensors 416 may be used as inputs to the drum light controller 402 for controlling operation of the drum light array 404 (e.g., based on sensed levels and/or sensed levels relative to set, stored threshold levels).

The drum light array 404 may include a plurality of light sources (such as lighting sources 32, 34, 36, 40, 42, 44, and 46 shown in FIGS. 1-3 and 6). For example, the light sources may be capable of generating red/blue/green/white light. The light sources of the drum light array 404 may be directional light sources (e.g., adapted to direct a beam of light at a specific object, such as the winch drum or clutch lever) and/or accent lighting sources. The accent lighting sources may be positioned throughout the winch 10 and may be a portion of the lighting sources 32, 34, 36, 40, 42, 44, and/or 46 shown in FIGS. 1-3 and 6. In this way, the lighting sources 32, 34, 36, 40, 42, 44, and/or 46 shown in FIGS. 1-3 may include both directional and accent lighting sources, in one embodiment. As one example, accent lighting may be manually turned on via the remote 420 and/or may automatically turn on responsive to winch operation (e.g., the winch being active). In addition to controlling the light sources of the drum light array 404, the drum light controller may control speakers 418 and/or cameras 414, as discussed below. For example, the drum light controller 402 may send control signals to the speakers 418 either directly or through the winch controller 408 which is in electronic communication with the speakers 418. In one example, the speakers 418 may be speakers coupled directly to the winch 10 (e.g., winch speakers). In another example, the speakers 418 may be speakers of the vehicle 422 to which the winch 10 is coupled (e.g., vehicle speakers).

Herein, the light sources of the drum light array 404, sensors including cameras 414, and audible speakers 418 may be activated in many ways. In one example, these may be automatically activated when the user selects to power in or out the winch rope via the winch remote 420. In another example, the sensors and light sources of the winch may be automatically activated when the winch drum is rotating and/or the winch is powered on. In yet another example, the user may activate the light sources, sensors, and speakers of the lighting and sensor system via a switch on the winch remote 420. Alternatively, the user may be able to activate the light sources, sensors, and speakers of the system by activating a switch on the winch controller 408 of the winch 10. In another example, the lighting system 28 and the sensor system 30 may automatically activate based on an output of the ambient light sensor 410. For example, if the output of the ambient light sensor 410 of the sensor system 30 reflects an ambient light level below a certain threshold (e.g., dark conditions), then the drum light controller 402 may activate the drum light array 404. In some examples, if the output of the ambient light sensor 410 is below the threshold, lighting system 28 and the sensor system 30 may be activated. In another example, the lights of the lighting system 28, such as task (e.g., directional) and/or accent lights may be turned on in response to input from an on/off button or switch on the winch controller 408 and/or winch remote 420 and/or in response to the winch operating (even if ambient light levels are not below the threshold). In one example, the lights of the lighting system 28, such as the task and/or accent lights, may remain turned on as long as the winch is powered on and operating. In still another example, the lights of the winch lighting system 28 may automatically turn off after a threshold amount of time of inactivity of the winch (e.g., an amount of time such as 6-9 hours in which the winch is not operating, such as the drum rotating).

Activating the lighting system 28 and sensor system 30 may include powering up (e.g., turning on) one or more light sources (such as accent lighting and/or direct lighting sources) of the drum light array 404 of the lighting system 28 and powering up the plurality of sensors (412 and 414) of the sensor system 30. Additionally, speakers and displays of the lighting and sensor system and/or winch 10 may be turned on. In yet another example, the lighting system 28, and the sensor system 30 may be automatically activated when a vehicle to which the winch 10 is attached to is turned on. In still another example, accent lighting of the drum light array 404 of the lighting system 28 may be automatically turned on, via the winch controller 408 and drum light controller 402, in response to an output received from the ambient light sensor indicating an ambient light level below a threshold while the vehicle 422 is keyed on and running (as output from a vehicle controller 424 of the vehicle 422).

Under certain conditions, the operation of the winch may need to be stopped. During such conditions, alerts may be issued to the user, resulting in proper management of the winch operation. As an example, the light sources of the drum light array 404 of the lighting system may generate white light during normal (e.g., base) winch operation. In an alternate example, the light sources of the drum light array 404 may generate blue light during normal winch operation. However, when a winch motor temperature exceeds a threshold temperature, the lighting may change from white (or blue) to red (or yellow), for example, thereby alerting the user to stop the winch operation. Herein, the sensor system 30 may include the additional winch sensors 416 which may include temperature sensors for monitoring the temperature of the winch motor. When the temperature sensor indicates that the winch motor has reached threshold temperature, the sensor system 30 may send a sensor signal to the drum light controller 402. In response to the received signal, the drum light controller 402 may send an actuation signal to the drum light array 404 and change the color of the lights of the drum light array 404 from white to red. In some examples, the drum light controller 402 of the lighting system 28 may issue a signal to the drum light array 404 to flash the lights of the drum light array 404 on and off at a certain frequency (and at a certain color, such as red or yellow). In some more examples, the flashing lights or red light of drum light array 404 may be accompanied by audio alerts sent to the user via speakers 418, for example.

As another example, the rope condition camera array 414 may report a rope condition to the drum light controller 402. For example, the rope condition camera array may capture images of the rope. In one example, the rope condition camera array 414 may send raw images to the drum light controller 402 to analyze. In another example, the rope condition camera array 414 may process the images captured, and determine the condition of the rope. If the rope is determined to be degraded based on the analysis performed by rope condition camera array 414, then the sensor signal including information on the kind of degradation, the degree of degradation, and the like may be sent to the drum light controller 402. Based on the sensor signal received from the rope condition camera array 414, the drum light controller 402 may adjust the drum light array 404, as described previously. For example, the drum light array may flash lights at a slower frequency to indicate a lesser degree of rope degradation, and may flash lights at a higher frequency to indicate a higher degree of rope degradation. Additionally or alternatively, the lights of the drum light array 404 may change color of the light based on the degree of degradation of the rope. For example, under normal operating condition, the drum light array 404 may display white lights. However, when the rope is degraded to a higher extent, the color of the drum light array may be changed to red (or an alternate color such as blue or green).

In yet another example, when the winch control system and/or vehicle battery voltage (as indicated from the vehicle controller 424) is below a threshold, the lighting may change from white to red, to indicate to the user to stop winch operation. In such conditions, continuing to operate the winch may result in degradation of one or more parts of the winch and/or vehicle system. As previously described, the alerts to the user may be alternatively sent as audio alerts via speakers of the system or as visual alerts via displays of the system (such as a display on the winch remote 420 and/or a display coupled with the vehicle 422).

In yet another example, when the winch system load exceeds a threshold load, as measured by the additional winch sensors 416 which may include a winch load sensor, the system may provide an alert to the user to stop operating the winch. Herein, the additional winch sensors 416 of the sensor system 30 may include a weight sensor and the weight sensor of the sensor system may be integrated to the winch 10 to estimate the load on the winch. When the output of the mass sensor indicates that the load on the winch is higher than the threshold load, then the sensor system may issue the sensor signal. Based on the sensor signal, the lighting system may change the color of the lights from white to red. When the user spots red light, the user may stop operating the winch. In this way, degradation of the winch and the accessory systems may be reduced.

Other example conditions when the user may be alerted via one or more of visual or audio alerts to stop the winch operation include when the winch clutch 426 is engaged, dis-engaged, or blocked, winch rope is payed out, payed in or stacked improperly, or when winch rope is degraded. In some cases, when the rope end (hook or other rigging device) is nearing the winch and/or stowed at a set load point, the winch operation may need to be stopped. In such situations, the sensor system 30 may issue the sensor signal based on the output of the rope proximity sensor array 412 of the sensor system. Based on the sensor signal, the drum light controller 402 of the lighting system 28 may issue a signal to the drum light array 404 to change the color of the lights of the drum light array 404 from white to red. In other examples, the drum light array 404 of the lighting system 28 may flash the lights to indicate to the user to stop winch operation. In this way, the drum light controller 402 may receive inputs from the winch controller, the lighting system 28, the sensor system 30, and may control the drum light array 404 to alert the operator about issues regarding the operation of the winch.

Figure 5:
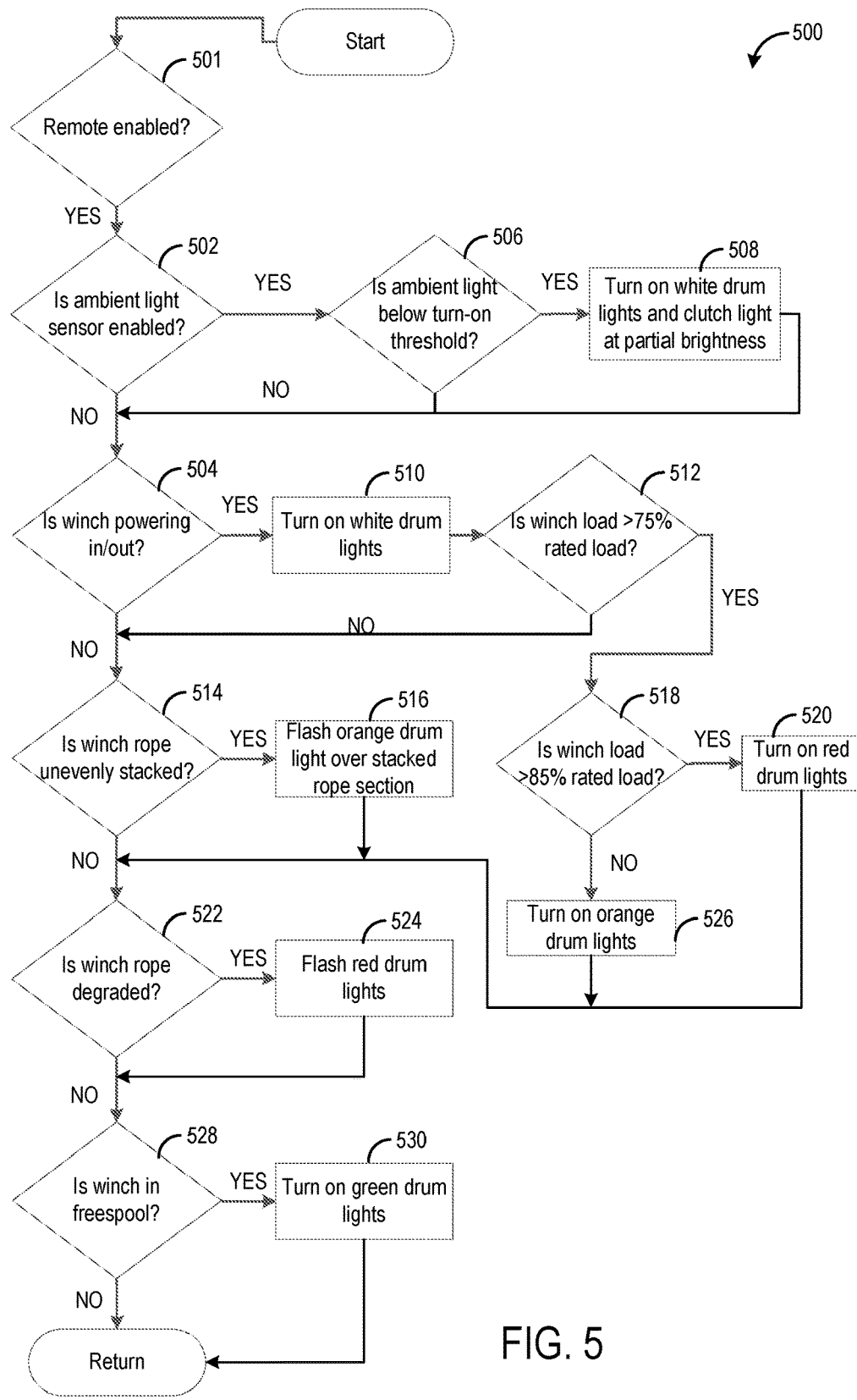
FIG. 5 shows a flow chart of an example method for controlling operation of the winch based on a plurality of light sources of the lighting system and a plurality of sensors of the sensor system.

Turning now to FIG. 5, an example method 500 for controlling the operation of a winch based on a plurality of light sources of a lighting system of the winch (such as lighting system 28 shown in FIGS. 1-4) and a plurality of sensors of a sensor system of the winch (such as sensor system 30 shown in FIGS. 2-4) is shown. Instructions for carrying out method 500 may be executed by a controller based on instructions stored on a memory of a controller (such as control unit 26 of FIGS. 1 and 3, and/or winch controller 408 shown in FIG. 4, and/or drum light controller 402 of FIG. 4) and in conjunction with signals received from sensors of lighting and sensor systems of the winch, such as the sensors described above with reference to FIGS. 1-4. The controller may employ actuators of the winch system to adjust winch operation, according to the method described below.

Method 500 begins at 501 where it is determined whether the winch remote (such as winch remote 420 shown in FIG. 4) is enabled (e.g., turned on or plugged into the winch controller). If the winch remote is not enabled at 501, the method may end. Otherwise, if the winch remote is enabled at 501, the method continues to 502 where an ambient light sensor is checked. In this way, the remote being enabled may cause the initiation of method 500. However, in alternate embodiments, method 500 may be initiated if the winch controller is powered on and/or the winch is operating.

As previously described, the winch may include a lighting system integrated with a sensor system. As such, the lighting system may include a plurality of light sources, and the sensor system may include a plurality of sensors such as an ambient light sensor. At 502, method 500 includes determining if the ambient light sensor of the sensor system is enabled. In one example, enabling the ambient light sensor may include turning on power to the ambient light sensor (e.g., if the winch is powered on, in one example). If the ambient light sensor is enabled (e.g., "YES" at 502), then method 500 proceeds to 506, where the controller determines if the ambient light is below a turn-on threshold. Herein, the turn-on threshold may be a light level at which one or more light sources of the lighting system (such as directional and/or accent lights) turns on. For example, if an ambient light level measured by the ambient light sensor is below a threshold level (e.g., the turn-on threshold), additional lighting of the winch or certain winch components may be needed for efficient winch operation and to increase ease of use for the winch operator. If the ambient light is below the threshold (e.g., "YES" at 506), then method 500 proceeds to 508 where the controller turns on white drum lights (e.g., lighting sources 32 and/or 34 shown in FIGS. 1-2 and/or lightening system 310 shown in FIG. 3) and a clutch light (e.g., lighting source 36 shown in FIGS. 1 and 3) at a partial (e.g., set threshold) brightness level (e.g., 50% brightness). The drum lights turned on at 508 may include directional lights (e.g., lights directed at the winch drum) and/or accent lights arranged proximate to the drum. In one example, the partial brightness level at 508 may be 50% brightness. However, in alternate embodiments, the partial brightness level at 508 may be 60% or 40% brightness. As described above with reference to FIG. 4, the lighting system may include a drum light array that includes a plurality of light sources emitting light of different colors (e.g., red, blue, green, orange, etc.) and white light. Thus, at 508, the controller may turn on the white drum lights and the clutch light (which may also be white light, in one example) and operate them at 50% brightness, for example. In alternate embodiments, the method may include turning on an alternate color light, such as blue lights, instead of white light. In this way, the lighting system may provide additional lighting to the winch (e.g., the winch drum and/or clutch lever) under low-light or dark operating conditions. The method at 508 may additionally include turning on accent lighting (which may include the drum lights and/or additional accent lights arranged on the winch) in response to ambient light being below the turn-on threshold while a vehicle to which the winch is coupled is on and running.

Method 500 proceeds to 504 from 508. Method 500 additionally proceeds to 500 if the ambient light sensor is not enabled (e.g., "NO" at 502) or if ambient light is below the turn-on threshold (e.g., "NO" at 506). At 504, method 500 includes checking if the winch is powering in or out. In one example, whether the clutch is engaged with the transmission and drum such that the motor is driving rotation of the drum may provide an indication of whether the winch in powering in or powering out. In one example, when the clutch is engaged with the transmission and the drum and the motor is operating to rotate the drum, the winch may be powering in or out (e.g., via power from the motor). Thus, rotation of the drum driven by the motor when the clutch is engaged may indicate that the winch is powering in/out, and accordingly, method 500 proceeds to 510.

At 510, method 500 includes turning on the white drum lights (e.g., at 100% brightness, for example), and method 500 proceeds to 512. At 512, method 500 includes checking if a load on the winch is higher than a first threshold. For example, the first threshold load may be set to 75% of a rated load of the winch. The controller may determine the load on the winch based on weight sensors of the sensor system, for example. In another example, the controller may determine the load on the winch based on an output of a tension sensor of the sensor system. If the winch load is higher than the threshold load (e.g., "YES" at 512), then method 500 proceeds to 518, otherwise method 500 proceeds to 514.

Method 500 also arrives at 514 from 504, if it is determined that the winch is neither powering in nor powering out (e.g., "NO" at 504). At 514, method 500 includes determining if the rope if being unevenly stacked. As described above, the sensor system may include rope proximity sensor arrays that determine a spacing between the windings of the rope as the rope is stacked. If the spacing between successive windings is not substantially equal, then the controller may determine that the rope is not being stacked evenly. Consequently, method 500 proceeds to 516, where orange drum lights (or an alternate colored light, other than white, in an alternate example) are flashed (e.g., at a set frequency) over the stacked rope section on the winch drum. Method 500 proceeds to 522. If the rope is being stacked evenly (e.g., "NO" at 514), then method 500 proceeds to 522.

Returning to 518 of method 500, the method includes determining if the load on the winch is higher than a second threshold. The second threshold may be higher than the first threshold but less than the rated load of the winch. For example, the second threshold may be set at 85% of the rated (e.g., maximum allowed) load of the winch. If the load on the winch is higher than the second threshold (e.g., "YES" at 518), method 500 proceeds to 520 where red drum lights are turned on, and method proceeds to 522. However, if the load on the winch is lower than the second threshold (e.g., "NO" at 518), method 500 proceeds to 526 where orange drum lights are turned on. In this way, the operator may be alerted about the load that is being handled by the winch. From 520 and 526, method 500 proceeds to 522.

At 522, method 500 includes determining if the winch rope is degraded. As previously described with reference to FIG. 4, the sensor system may include a rope condition camera array that monitors the rope condition. The rope condition camera array may determine a level of degradation (e.g., an amount of fraying, stretching, etc.) of the winch rope. If the level of degradation is higher than a threshold level, the winch rope may be considered degraded. If the winch rope is degraded (e.g., "YES" at 522), then method 500 proceeds to 524, where red drum lights are flashed. However, if the winch rope is not degraded (e.g., the level of degradation is lower than a threshold level), then method 500 proceeds to 528.

At 528, method 500 includes determining if the winch is in freespool. As explained previously, the clutch may disengage the gear reduction unit with the drum, thereby allowing the drum to freespool (e.g., freely rotate without input from the motor and gear reduction unit), respectively. When freespooling occurs, then method 500 proceeds to 530 where the green drum lights are turned on, if not, method 500 returns. In this way, the lighting system of the winch may alert the operator of the winch about the operating condition of the winch. As illustrated, the drum lights may be flashed or displayed in different colors to indicate different issues or condition of the rope and the winch system. In this way, the operator may be alerted of conditions such as rope degradation and uneven stacking of rope, for example, and the operator may be able to take corrective actions to reduce further degradation or disruption. In addition, the operator may be able to realize when the winch is powering in/out or whether the winch is freespooling or load on the winch by simply monitoring the color of the drum lights. Therefore, the operator may be able to gauge the operation of the winch even from a remote location (e.g., a location away from the winch and/or a vehicle to which the winch is coupled).

While method 500 describes changing a base, white, light color of the lighting system to red or orange to indicate different warnings or winch status alerts to a user, in other embodiments, the based lighting color may be an alternate color such as blue. Additionally, the "warning" or "alert" colors described in method 500 may instead be yellow, green, or some other combination of colors and the different warnings may include holding steady or flashing the lights of the lighting system in the different colors. However, each type of warning (winch rope degradation vs. uneven winch rope stacking vs. winch load vs. winch motor temperature) may have a different color light and/or flashing frequency associate it. As a result, a user may recognize from the displayed light colors and/or flashing frequency what type of alert is being indicated by the lighting system.

In this way, the sensor system having a plurality of sensors may be integrated with the lighting system of the winch. Winch operation may be continuously monitored based on the sensor output of the one or more sensors of the sensor system. The technical effect of integrating the sensor system and the lighting system is that an operator may have increased awareness of a status of the winch (e.g., such as a condition of the rope and/or powering mode of the drum and motor) and the winch may be operated more efficiently in reduced lighting environments without the need of auxiliary lighting systems. In this way, degradation of winch system may be reduced and ease of winch operation may be increased.

As one embodiment, a lighting control system for a winch, comprises: a plurality of lights coupled to the winch; a plurality of sensors coupled to the winch; and a controller including memory with instructions for: adjusting an output of the plurality of lights in response to one or more signals received from one or more of the plurality of sensors to indicate an operational status of the winch. In a first example of the lighting control system, the plurality of sensors includes an ambient light sensor and the plurality of lights includes one or more of a winch drum light and a winch clutch lever light. A second example of the lighting control system optionally includes the first example and further includes, wherein the ambient light sensor is arranged proximate to at least a portion of the plurality of lights. A third example of the lighting control system optionally includes one or more of the first and second examples, and further includes, wherein the plurality of lights include both directional lights adapted to direct light at one or more of a winch drum, clutch lever, rope, hook, and remote socket of the winch and accent lights. A fourth example of the lighting control system optionally includes one or more of the first through third examples, and further includes, wherein the plurality of lights includes a winch drum light adapted to illuminate an area of a winch drum of the winch. A fifth example of the lighting control system optionally includes one or more of the first through fourth examples, and further includes, wherein the plurality of lights additionally includes a clutch light coupled to a side of the winch and adapted to illuminate a clutch lever of the winch, the clutch lever coupled to a top of a housing of a gear reduction unit of the winch. A sixth example of the lighting control system optionally includes one or more of the first through fifth examples, and further includes, wherein the plurality of sensors includes one or more of an ambient light sensor, a proximity sensor, a rope layer sensor, and a camera. A seventh example of the lighting control system optionally includes one or more of the first through sixth examples, and further includes, wherein the plurality of sensors are coupled to and arranged along a bottom surface of a tie plate of the winch which faces a top, outer surface of a drum of the winch, the tie plate positioned vertically above the drum and coupled between a first drum support and second drum support of the winch. An eighth example of the lighting control system optionally includes one or more of the first through seventh examples, and further includes, wherein adjusting the output of the plurality of lights in response to one or more signals received from one or more of the plurality of sensors to indicate an operational status of the winch includes changing one or more of a color or flashing frequency of light output by the plurality of lights. A ninth example of the lighting control system optionally includes one or more of the first through eighth examples, and further includes, wherein the one or more signals received from one or more of the plurality of sensors include a signal indicating one or more of a temperature of a motor of the winch, a voltage level of a vehicle battery coupled to the winch, a load of the winch, a winch rope condition, and a powering in/out status of a drum of the winch. A tenth example of the lighting control system optionally includes one or more of the first through ninth examples, and further includes, wherein the plurality of lights include a light arranged proximate to a remote socket of the winch. An eleventh example of the lighting control system optionally includes one or more of the first through tenth examples, and further includes wherein adjusting the output of the plurality of lights in response to one or more signals received from one or more of the plurality of sensors to indicate an operational status of the winch includes changing each of a color and flashing frequency of light output by the plurality of lights. A twelfth example of the lighting control system optionally includes one or more of the first through eleventh examples, and further includes, wherein at least a portion of the plurality of lights are lighting sources of an accessory lighting system that is mounted to a top surface of the winch, above a drum of the winch. A thirteenth example of the lighting control system optionally includes one or more of the first through twelfth examples, and further includes, wherein the plurality of lights include a light arranged proximate to a power port of the winch in order to illuminate the power port.

As another embodiment, a method for controlling lighting of a winch, comprises: in response to operation of the winch when ambient light detected at the winch is below a threshold level, activating a plurality of lights coupled to the winch to output a first output; and adjusting the plurality of lights to output a different, second output in response to a changed operational status of the winch indicated by one or more winch sensors of the winch. In a first example of the method, activating the plurality of lights to output the first output includes activating the plurality of lights to output light of a first color and wherein adjusting the plurality of lights to output the second output includes activating the plurality of lights to output light of a different, second color. A second example of the method optionally includes the first example and further includes, wherein adjusting the plurality of lights to output the second output includes activating the plurality of lights to change from outputting light constantly at a first color to outputting flashing light at a different, second color. A third example of the method optionally includes one or more of the first and second examples, and further includes, wherein the changed operational status of the winch includes an increase in load of the winch over a threshold level. A fourth example of the method optionally includes one or more of the first through third examples, and further includes, wherein the changed operational status of the winch includes a current level of the winch increasing over a threshold level. A fifth example of the method optionally includes one or more of the first through fourth examples, and further includes, wherein the changed operational status of the winch includes a voltage level of power supplied to the winch from a vehicle battery decreasing below a threshold level. A sixth example of the method optionally includes one or more of the first through fifth examples, and further includes, wherein the changed operational status of the winch includes a change in operation of a winch drum of the winch between a freespool and powering in/out mode. A seventh example of the method optionally includes one or more of the first through sixth examples, and further includes, wherein the plurality of lights coupled to the winch include lights arranged to illuminate one or more of a winch drum, power port, and remote socked of the winch.

As yet another embodiment, a winch comprises: a winch drum; a lighting system including a first plurality of lights arranged proximate to the winch drum and adapted to illuminate an outer surface of the winch drum; a sensor system including one or more sensors coupled to the winch; and a control unit including a controller having memory with instructions for: during operation of the winch controlling the first plurality of lights to output light of a first color; and in response to the one or more sensors indicating operation of the winch at an operational threshold, adjusting an output of the first plurality of lights to output light of a different, second color. In a first example of the winch, the indicating operation of the winch at an operational threshold includes one or more of an indication of a temperature of a motor of the winch being above a temperature threshold, an indication of a supply voltage of the winch being below a threshold supply voltage, an indication of a load of the winch being above a threshold load, and an indication of a current of the motor being above a current threshold. A second example of the winch optionally includes the first example and further includes, a clutch lever coupled to a top of a housing of a gear reduction unit of the winch and a second plurality of lights coupled to a side of the control unit, where the second plurality of lights face the clutch lever.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A lighting control system for a winch, comprising:
a plurality of lights coupled to the winch;
a plurality of sensors coupled to the winch; and
a controller including memory with instructions for:
adjusting an output of the plurality of lights in response to one or more signals received from one or more of the plurality of sensors to indicate an operational status of the winch, wherein adjusting the output of the plurality of lights includes changing one or more of a color, brightness, and flashing frequency of light output by the plurality of lights.

2. The lighting control system of claim 1, wherein the plurality of sensors includes an ambient light sensor and wherein the plurality of lights includes one or more of a winch drum light and a winch clutch lever light.

3. The lighting control system of claim 2, wherein the ambient light sensor is arranged proximate to at least a portion of the plurality of lights.

4. The lighting control system of claim 1, wherein the plurality of lights include both directional lights adapted to direct light at one or more of a winch drum, clutch lever, rope, hook, and remote socket of the winch and accent lights.

5. The lighting control system of claim 1, wherein the plurality of lights includes a winch drum light adapted to illuminate an area of a winch drum of the winch.

6. The lighting control system of claim 5, wherein the plurality of lights additionally includes a clutch light coupled to a side of the winch and adapted to illuminate a clutch lever of the winch, the clutch lever coupled to a top of a housing of a gear reduction unit of the winch.

7. The lighting control system of claim 1, wherein the plurality of sensors includes one or more of an ambient light sensor, a proximity sensor, a rope layer sensor, and a camera.

8. The lighting control system of claim 7, wherein the plurality of sensors are coupled to and arranged along a bottom surface of a tie plate of the winch which faces a top, outer surface of a drum of the winch, the tie plate positioned vertically above the drum and coupled between a first drum support and second drum support of the winch.

9. The lighting control system of claim 1, wherein the one or more signals received from one or more of the plurality of sensors include a signal indicating one or more of a temperature of a motor of the winch, a voltage level of a vehicle battery coupled to the winch, a load of the winch, a winch rope condition, and a powering in/out status of a drum of the winch.

10. A method for controlling lighting of a winch, comprising:
in response to operation of the winch when ambient light detected at the winch is below a threshold level, activating a plurality of lights coupled to the winch to output a first output, wherein activating the plurality of lights to output the first output includes activating the plurality of lights to output light of a first color; and
adjusting the plurality of lights to output a different, second output in response to a changed operational status of the winch indicated by one or more winch sensors of the winch, wherein adjusting the plurality of lights to output the second output includes activating the plurality of lights to output light of a different, second color.

11. The method of claim 10, wherein adjusting the plurality of lights to output the second output includes activating the plurality of lights to change from outputting light constantly at the first color to outputting flashing light at the different, second color.

12. The method of claim 10, wherein the changed operational status of the winch includes an increase in load of the winch over a threshold level.

13. The method of claim 10, wherein the changed operational status of the winch includes a current level of the winch increasing over a threshold level.

14. The method of claim 10, wherein the changed operational status of the winch includes a voltage level of power supplied to the winch from a vehicle battery decreasing below a threshold level.

15. The method of claim 10, wherein the changed operational status of the winch includes a change in operation of a winch drum of the winch between a freespool and powering in/out mode.

16. A winch, comprising:
a winch drum;
a lighting system including a first plurality of lights arranged proximate to the winch drum and adapted to illuminate an outer surface of the winch drum;
a sensor system including one or more sensors coupled to the winch; and
a control unit including a controller having memory with instructions for:
during operation of the winch controlling the first plurality of lights to output light of a first color; and
in response to the one or more sensors indicating operation of the winch at an operational threshold, adjusting an output of the first plurality of lights to output light of a different, second color.

17. The winch of claim 16, wherein the indicating operation of the winch at an operational threshold includes one or more of an indication of a temperature of a motor of the winch being above a temperature threshold, an indication of a supply voltage of the winch being below a threshold supply voltage, an indication of a load of the winch being above a threshold load, and an indication of a current of the motor being above a current threshold.

18. The winch of claim 16, further comprising a clutch lever coupled to a top of a housing of a gear reduction unit of the winch and a second plurality of lights coupled to a side of the control unit, where the second plurality of lights face the clutch lever.

* * * * *